United States Patent
Christenson (10) Patent No.: US 6,366,932 B1
(45) Date of Patent: Apr. 2, 2002

(54) APPARATUS AND METHOD FOR ACCESSING AN OBJECT ORIENTED OBJECT USING A SMART PASSIVE REFERENCE

(75) Inventor: David Alan Christenson, Elgin, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,533

(22) Filed: Jun. 24, 1999

(51) Int. Cl.[7] ............................................... G06F 17/30
(52) U.S. Cl. ....................................................... 707/206
(58) Field of Search .......................................... 707/206

(56) References Cited

U.S. PATENT DOCUMENTS

| | | | | |
|---|---|---|---|---|
| 5,398,334 A | * | 3/1995 | Topka et al. ................ | 707/206 |
| 5,546,584 A | * | 8/1996 | Lundin et al. .............. | 709/303 |
| 5,644,709 A | * | 7/1997 | Austin ......................... | 714/53 |
| 5,752,249 A | * | 5/1998 | Macon, Jr. et al. ......... | 707/103 |
| 5,761,511 A | * | 6/1998 | Gibbons et al. ............ | 395/705 |
| 5,794,256 A | * | 8/1998 | Bennett et al. .............. | 707/206 |
| 5,923,877 A | * | 7/1999 | Berner et al. ................ | 395/703 |
| 5,999,987 A | * | 12/1999 | O'Farrell et al. ........... | 709/304 |
| 6,031,995 A | * | 2/2000 | George ........................ | 395/710 |
| 6,105,041 A | * | 8/2000 | Bennett et al. ............. | 707/206 |
| 6,125,364 A | * | 9/2000 | Greef et al. ................. | 707/103 |
| 6,142,684 A | * | 11/2000 | Kirshenbaum et al. ..... | 395/708 |
| 6,144,965 A | * | 11/2000 | Olivever ..................... | 101/100 |
| 6,182,107 B1 | * | 1/2001 | Atsatt ......................... | 709/100 |

\* cited by examiner

*Primary Examiner*—Wayne Amsbury
(74) *Attorney, Agent, or Firm*—Martin & Associates, LLC; Derek P. Martin (57) ABSTRACT

A smart passive reference to an object oriented object provides control over creation and deletion of the object it references. A reference count is incremented when an active reference to an object is created, and is decremented when an active reference to the object is deleted. The smart passive reference allows suspending the activity of a thread until no threads have active references to the object. In addition, the smart passive reference can be used to invalidate the smart passive references in other threads, thereby allowing a thread to obtain exclusive access to an object. The smart passive reference also provides an interface to cause the managed object to be deleted when the reference count goes to zero.

38 Claims, 8 Drawing Sheets

APPARATUS AND METHOD FOR ACCESSING AN OBJECT ORIENTED OBJECT USING A SMART PASSIVE REFERENCE

BACKGROUND OF THE INVENTION

1. Technical Field

This invention generally relates to object oriented programming and more specifically relates to an apparatus and method for accessing object oriented objects in an object oriented system.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

Modern object oriented programming languages have features that improve the convenience of programming in those languages. For example, the Java programming language developed by Sun Microsystems defines a "smart reference" for an object, which is a reference to the object that contains intelligence regarding when and how the object is referenced by other objects and when and how the object is created and deleted. In the C++ programming language, these types of smart references are referred to as "smart pointers". For the discussion herein, the term "smart pointer" is used to refer to active pointers and references to objects. A reference is "active" if it is used to directly access an object. A reference is "passive" if it is not used to directly access an object, but if it can determine whether the object should be accessed.

Smart pointers are especially useful for heap-based objects, referred to herein as "managed objects". These managed objects typically contain a reference count to keep track of all references to the object. As long as the reference count is non-zero, the object is still being referenced. When the reference count goes to zero, the managed object may be deleted. The smart pointers increment the reference count of a managed object when each smart pointer is created, and the reference count is decremented after deleting a smart pointer to the object. Thus, if a smart pointer holds an active reference to a managed object, the managed object will not be deleted. Once all active references are deleted, the reference count goes to zero, and the managed object can then be deleted.

While reference counting is powerful, it suffers from some problems. For example, reference counting cannot detect circular references. A circular reference is when two or more objects refer to one another, preventing the reference count of any of the objects from going to zero. This situation results in maintaining objects in memory that could and should be deleted. In addition, there is no mechanism for granting exclusive access to a managed object. Without a mechanism for solving the problems of known smart pointers and reference counting, the computer industry will continue to suffer from object oriented computer systems that have the undesirable features discussed above.

DISCLOSURE OF INVENTION

A smart passive reference to an object oriented object provides control over creation and deletion of the object it references. A reference count is incremented when an active reference to an object is created, and is decremented when an active reference to the object is deleted. The smart passive reference allows suspending the activity of a thread until no threads have active references to the object. In addition, the smart passive reference can be used to invalidate the smart passive references in other threads, thereby allowing a thread to obtain exclusive access to an object. The smart passive reference also provides an interface to cause the managed object to be deleted when the reference count goes to zero.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object. This feature of object oriented programming promotes the reusability of existing object definitions and promotes more efficient use of program code.

There are many computer languages that presently support object oriented programming techniques. For example, Smalltalk, Object Pascal, C++ and Java are all examples of programming languages that support object oriented programming to one degree or another.

Multi-threaded Computer Systems

Many modern computer systems provide a multi-process environment, which allows the computer system to execute multiple processes in parallel. One specific type of computer system that is capable of executing multiple processes is known as a multi-threaded computer system. In a multi-threaded computer system, multiple threads of control are available to the operating system. The operating system assigns different threads to different processes. Because an object may be accessed by multiple threads, smart pointers were developed to determine whether an object is still being accessed. However, known smart pointers can create circular references, and cannot exclude other threads from accessing an object, as discussed in the Background section.

2. Detailed Description

According to a preferred embodiment of the present invention, an apparatus and method provide for accessing managed objects using a smart passive reference. Active references (i.e., enhanced smart pointers) are created from this passive reference. The passive reference avoids the problem of circular references discussed in the Background section, and allows more intelligence and control over the creation, access and deletion of a managed object.

Figure 1:
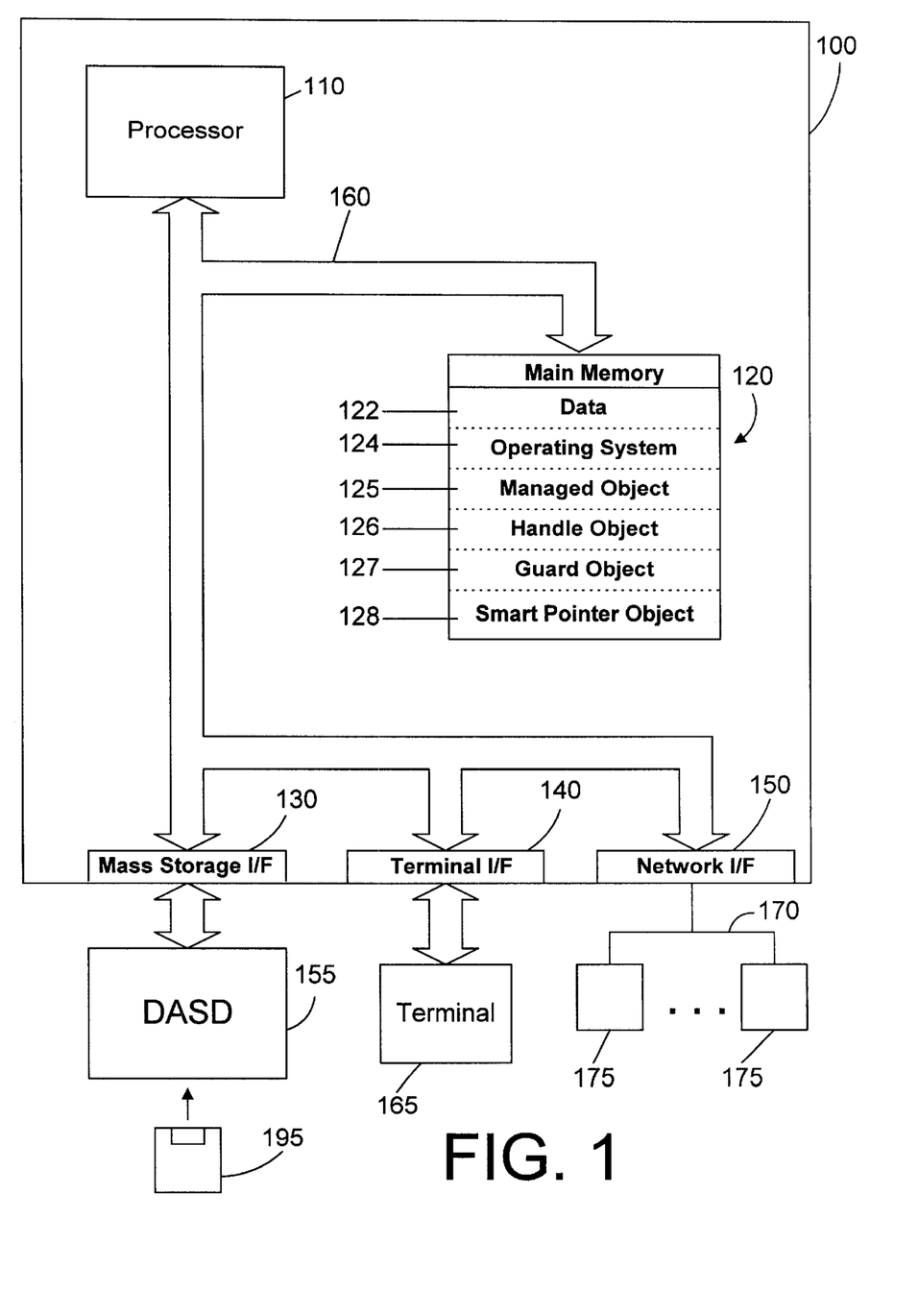
FIG. 1 is a block diagram of an apparatus in accordance with a preferred embodiment of the present invention.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, one or more managed objects 125, one or more handle objects 126, one or more guard objects 127, and one or more smart pointer objects 128 in accordance with the preferred embodiments. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, managed object 125, handle object 126, guard object 127, and smart pointer object 128 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language. Managed object 125 is any object that can be stored on and retrieved from a heap or free store. Note that the terms "object" and "instance" are used interchangeably herein. Handle object 126 is a smart passive reference that is created once an instance of the managed object is created. Guard object 127 is a helper object for the handle object 126, and controls access to the managed object and deletes the managed object at the appropriate time. While the preferred embodiment includes a Guard object 127, note that some of the intelligence and functions of Guard object 127 may be incorporated into a handle object 126, or elsewhere within computer system 100. Smart pointer object 128 is an enhanced smart pointer that is created using the handle object 126. Smart pointer object 128 assures authorized access to managed object 125. In a multi-threaded system, each thread typically contains its own smart pointer object 128, and may include multiple smart pointer objects 128.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/ Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
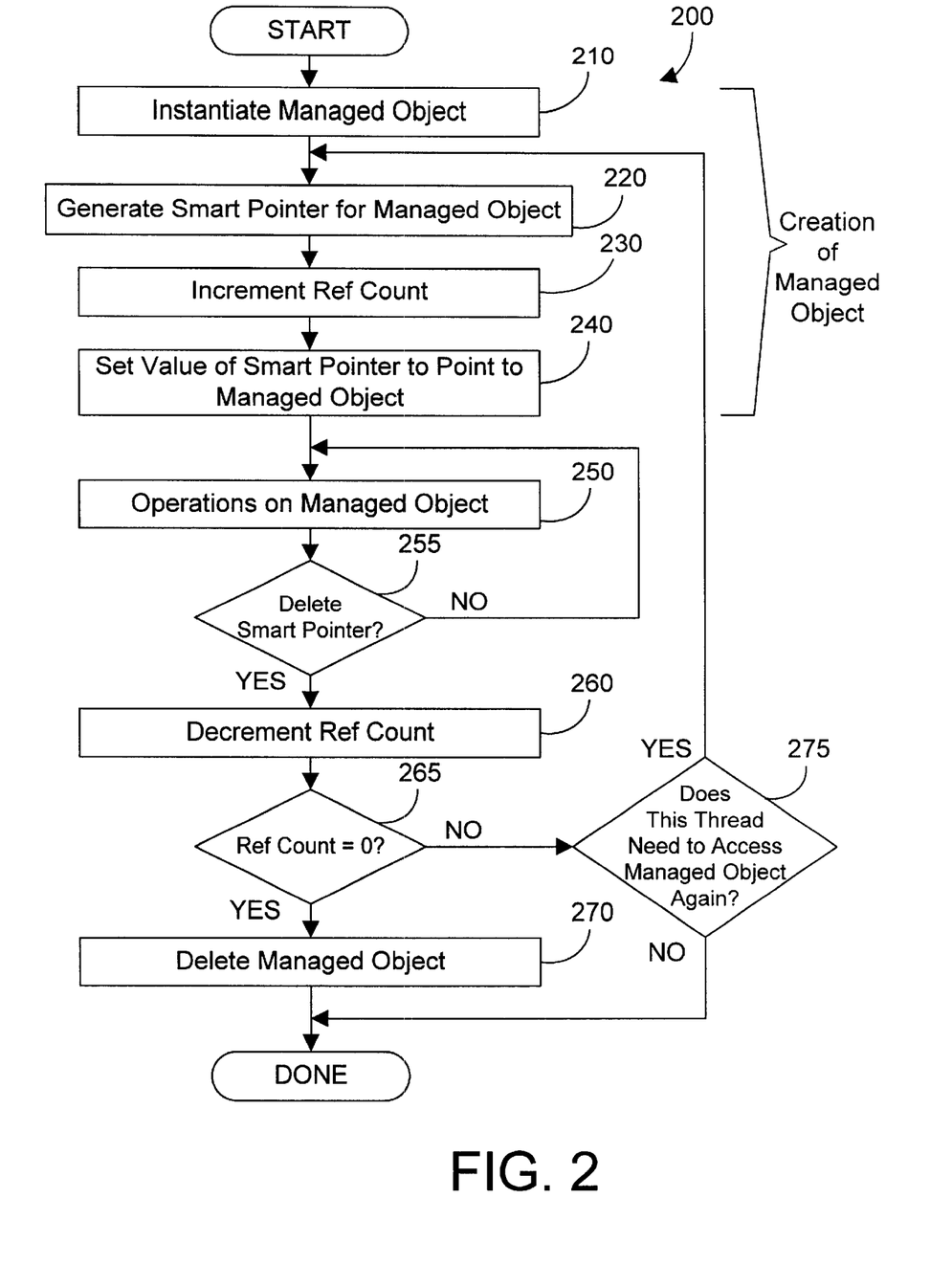
FIG. 2 is a flow diagram of one possible method for creating, accessing, and deleting objects in an object oriented system.

Referring to FIG. 2, a method 200 is used to create, use and delete a managed object in accordance with the prior art. We assume that the steps of method 200 are performed by a single thread of control in a computer system. First, the managed object must be created. The creation of the managed object spans steps 210 through 240. First, the managed object is instantiated (step 210). Known managed objects typically include a reference count to track the number of active references to the object. When the managed object is instantiated, the reference count is set to a value of zero. A smart pointer is then generated for the newly created managed object (step 220) with a null value. Because a smart pointer, which is an active reference to the managed object, was just created in step 220, the reference count is incremented (step 230). The value of the smart pointer is then set to point to the managed object (step 240). At this point the managed object and an associated active reference have been created, so the object may be accessed as required. Step 250 depicts operations on the managed object, which is a general way of saying that the object may be accessed to perform any suitable operation. If the thread has more operations to perform, the smart pointer does not need to be deleted (step 255=NO), and the thread continues accessing the object. Once the thread has completed all desired operations on the object, the smart pointer is deleted (step 255=YES). The reference count is then decremented (step 260) to reflect that an active reference (i.e., smart pointer) has been deleted in step 255. If the reference count is zero (step 265=YES), there are no more active references to this object (e.g., by other threads), so the managed object is deleted (step 270). If the reference count is not zero (step 265=NO), there are still other threads that hold active references to the object, so the object need not be deleted. If the current thread needs to access the managed object again (step 275=YES), method 200 returns control to step 220 so a new smart pointer can be generated for the managed object. If the current thread does not need to access the managed object again (step 275=NO), the current thread is done, and the deletion of the object is left for another thread when it detects that the reference count goes to zero after decrementing the reference count in step 260.

One problem with method 200 is that circular references between managed objects may prevent the reference count from ever going to zero, so the object will never be deleted. Thus, both objects will remain in memory, causing inefficient use of memory resources. In addition, other enhanced functions are desired, which are provided by a method in accordance with the preferred embodiments, shown in FIGS. 3 and 4.

Figure 3:
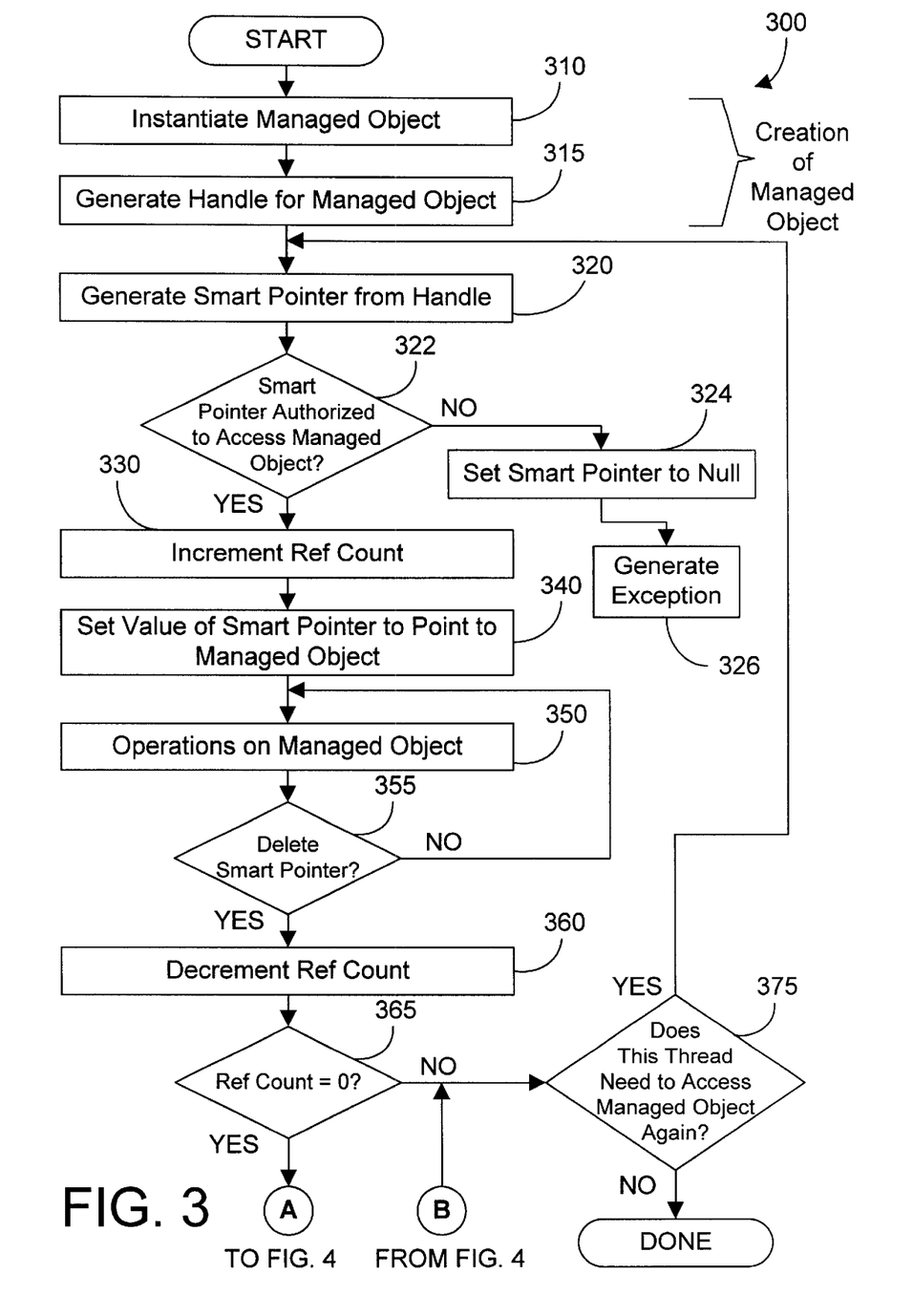
FIGS. 3 and 4 are both portions of a flow diagram of a method for accessing object oriented objects using a passive reference in accordance with the preferred embodiments of the invention.
Figure 4:
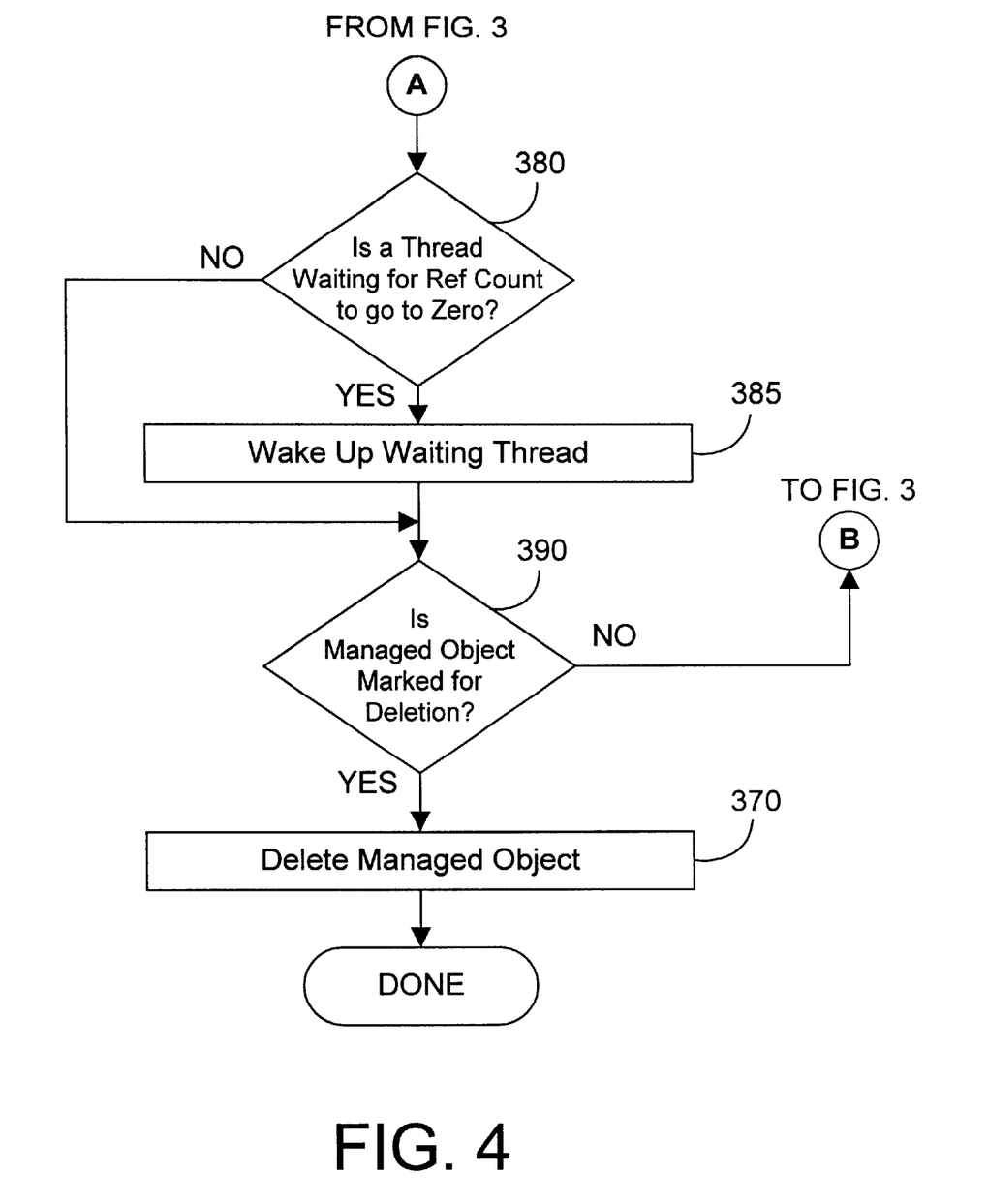

Referring to FIG. 3, a method 300 for creating, accessing, and deleting a managed object in accordance with the preferred embodiments uses a "handle", which is a smart passive reference to the managed object. The creation of a managed object in accordance with the preferred embodiment does not require the creation of a smart pointer. First, the managed object is instantiated (step 310). Next, a handle is generated for the managed object (step 320). For method 300, instead of setting the reference count to one when the managed object is created, it is set to zero because there are no active references to the managed object. Unlike as shown in FIG. 3, the ManagedObject is alive even though there are no SmartPointer object instances. The preferred embodiments are therefore more flexible than method 300, since the deletion of the managed object is based on both the reference count and the client's desire to have it deleted.

Once the handle is created, a smart pointer is generated from the handle (step 320). The function of the smart pointer is preferably analogous to prior art smart pointers, with the exception that the smart pointer in method 300 is generated by specifying a handle and has knowledge of the handle for the managed object. However, a completely different smart pointer that is non-analogous to prior art smart pointers can also be used, so long as they perform the pertinent functions described in this specification.

Once a smart pointer is created, method 300 determines whether the smart pointer is authorized to access the managed object (step 322). Obviously, if the smart pointer was just created, as shown in FIG. 3, the smart pointer would be authorized to access the object. However, there may be other scenarios where a smart pointer has been created from a handle, and the handle is subsequently invalidated by another thread, thereby preventing the current thread from accessing the managed object. If the smart pointer is not authorized to access the managed object (step 322=NO), the smart pointer is set to null (step 324), and an exception is generated (step 326) to inform the system that the smart pointer was unable to obtain access to the managed object.

If the smart pointer is authorized to access the managed object (step 322=YES), the reference count is incremented (step 330), and the value of the smart pointer is set to point to the managed object (step 340). At this point, the current thread may perform any suitable operations on the managed object (step 350). When the current thread is done with operations on the object, it decides to delete the smart pointer (step 355=YES). The reference count is then decremented (step 360), and a determination is made regarding whether or not the reference count just went to zero (step 365). If the reference count went to zero (step 365=YES), method 300 continues with step 380 in FIG. 4 by determining whether a thread is waiting for the reference count to go to zero. If so (step 380=YES), the waiting thread is woken up (step 385). Next, method 300 determines whether the managed object is marked for deletion (step 390). If so (step 390=YES), the managed object is deleted (step 370). If the managed object is not marked for deletion (step 390=NO), method 300 returns to step 375 of FIG. 3 to determine whether the current thread needs to access the managed object again. If not (step 375=NO), method 300 is done for the current thread. If so (step 375=YES), the current thread returns to step 320 to generate a new smart pointer to access the managed object again. Note that step 375 is also encountered if the reference count did not go to zero in step 365.

Note that many of the steps of method 300 are similar to steps performed in the prior art method 200 of FIG. 2. For example, steps 210, 220, 230, 240, 250, 260, 265, 270, and 275 all have corresponding steps 310, 320, 330, 340, 350, 360, 365, 370, and 375 in method 300 of FIG. 3. Some of these steps in FIG. 3 may be identical to the corresponding steps in the prior art. For example, the instantiation of the managed object in step 310 may be identical to the instantiation of the managed object in step 210. However, it is equally within the scope of the preferred embodiments for each of these steps to perform additional or different functions than the corresponding prior art steps. For example, the smart pointer generated in step 320 is generated from the handle, which is not present for step 220 of FIG. 2. The steps of method 300 in FIGS. 3 and 4 can thus perform additional or different functions than the corresponding steps in method 200 of FIG. 2.

A preferred implementation of the smart passive reference is shown in FIGS. 5–8. Note that this implementation is simply one suitable example, and is not intended to be limiting. Many alternative implementations are possible within the scope of the preferred embodiments.

Figure 5:
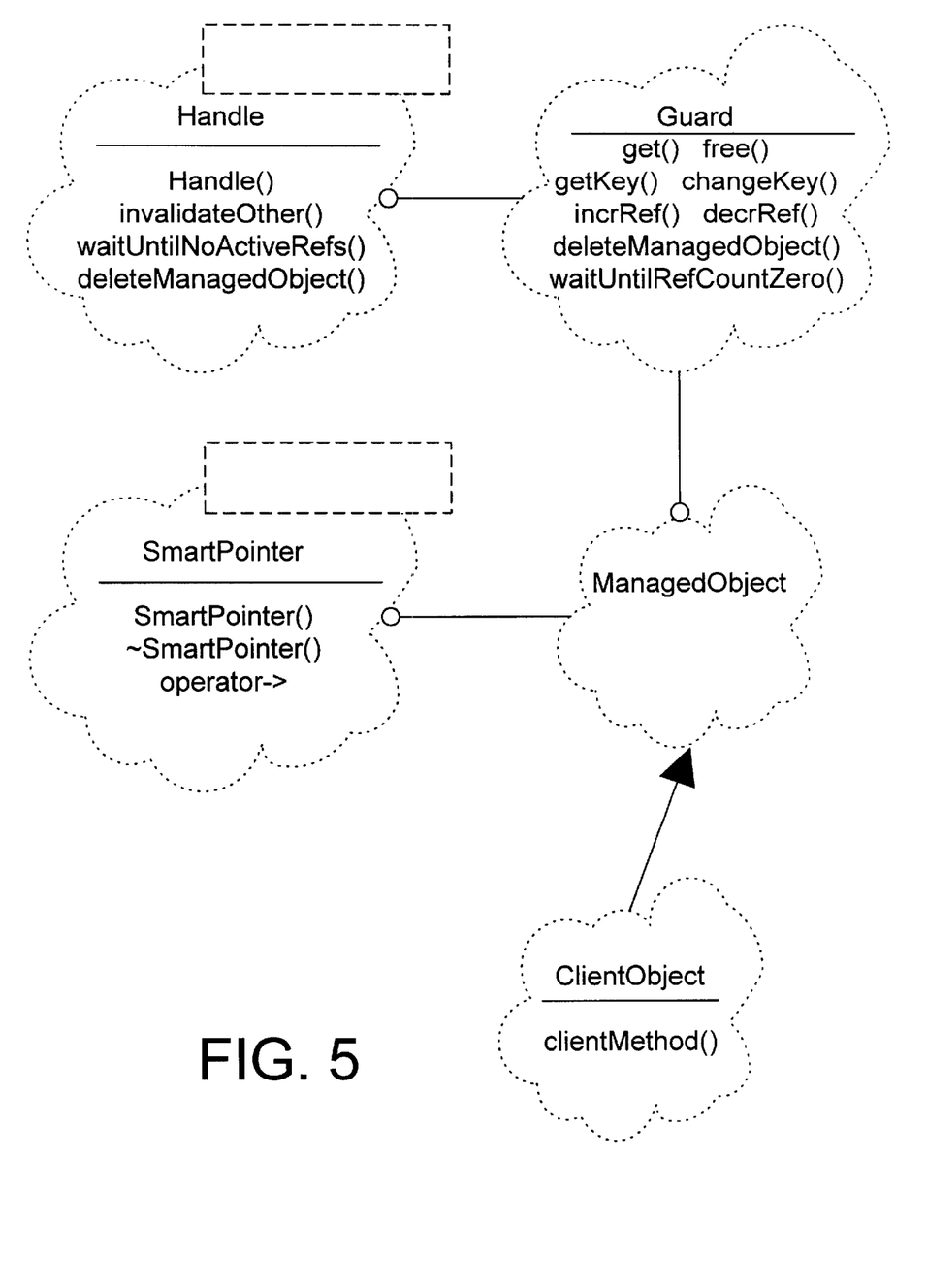
FIG. 5 is a class diagram of a managed object that may be accessed using a passive reference in accordance with the preferred embodiments.

Referring to FIG. 5, a managed object class is defined that contains the intelligence for using the smart passive reference. For a programmer to make a class a managed object, the programmer must simply inherit from the ManagedObject class. Thus, for the specific example of FIG. 5, a client object ClientObject is defined that inherits from the ManagedObject class. By inheriting from the ManagedObject class, the ClientObject becomes a managed object. Note that this inheritance can be by subclassing, implementing the interface, or any other suitable form of inheritance. The ManagedObject class has a using relationship with a Guard class, which is a helper class for the Handle class, as described below. The Handle class is a templatized class that defines the smart passive reference of the preferred embodiments. The Handle class defines a Handle( ) method that is used to create an instance of the Handle class. The Handle class also defines an invalidateOther( ) method that may be called to invalidate the handles for the ClientObject in other threads. The Handle class further defines a waitUntilNoActiveRefs( ) method that is called to put a thread in a suspended state (i.e., a sleep state) until no other threads hold active references to the ClientObject. In addition, the Handle class defines a deleteManagedObject( ) method that is invoked when a thread desires to delete a managed object. The Handle class also defines a unique key that is used to validate access to the ClientObject. Access to the ClientObject is only permitted if the key in the Handle class matches a corresponding key in the Guard class. The Handle class further defines a guardPointer that points to the Guard instance that controls access to the client object.

The Guard class is a helper class for the Handle class to ease the implementation of the smart passive reference of the preferred embodiments. The Guard class defines persistent objects that exist on a heap, and that can be allocated from a pool of guard objects when created and returned to the pool when deleted. The Guard class defines a get( ) method for getting a managed object from the heap, and a free( ) method for returning a managed object to the heap. In addition, the Guard class also defines a getKey( ) method that returns the key in the Guard object, and a changeKey( ) method that is used to change the key in the guard object to effectively invalidate the current Handle, preventing future accesses to the ManagedObject by the thread using the current Handle. The Guard class also defines the reference counter, and includes methods incrRef( ) to increment the reference counter and decrRef( ) to decrement the reference counter. In addition, a deleteManagedObject( ) method is defined that marks the ClientObject corresponding to the Guard object for deletion, and a waitUntilRefCountZero( ) method is defined that suspends a thread until the reference count goes to zero. The Guard class defines a key, as described above, that is used to control access to the ClientObject by assuring that its key matches the key in the corresponding Handle object. In addition, the Guard class defines status data that is used to determine whether another thread is waiting to access the ClientObject, and whether the ClientObject has been marked for deletion. The Guard class also defines a managedObjectPtr that points at the ClientObject.

A SmartPointer templatized class is also defined that has a using relationship with the ManagedObject class to indicate that the SmartPointer may invoke one or more methods on the managed object. The SmartPointer class defines a SmartPointer( ) constructor method to create an instance of the SmartPointer class, and a ~SmartPointer( ) destructor method to delete an instance of the SmartPointer class. The SmartPointer class further defines an operator-> method which allows a client object to use the operator-> method like a pointer to a ClientObject. The Handle, Guard, and SmartPointer classes contain the intelligence for the smart passive reference of the preferred embodiments, which dictates how the managed object is created, accessed, and deleted.

Figure 6:
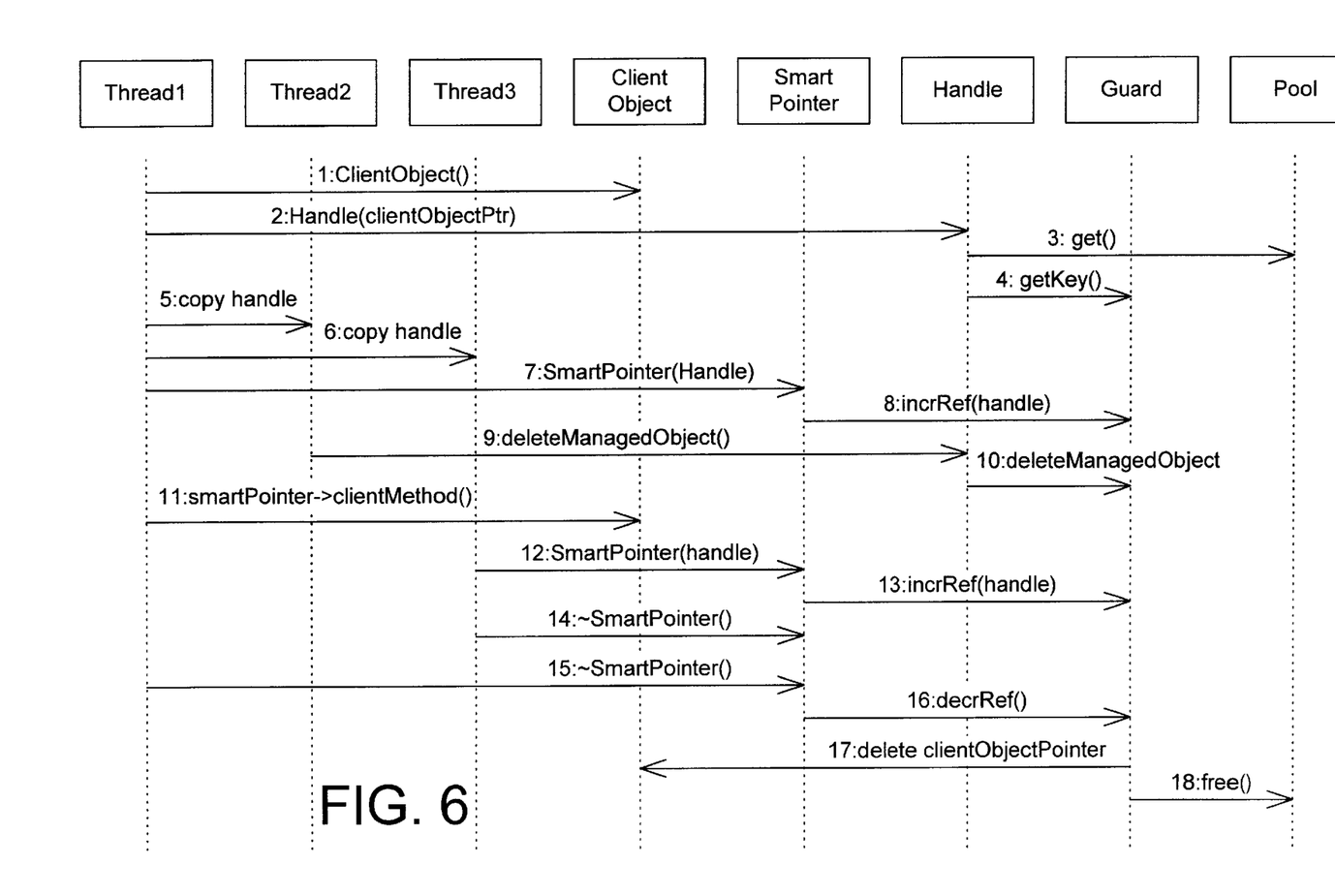
FIG. 6 is an object interaction diagram showing the steps taken for the classes of FIG. 5 to create, access and delete the managed object.
Figure 7:
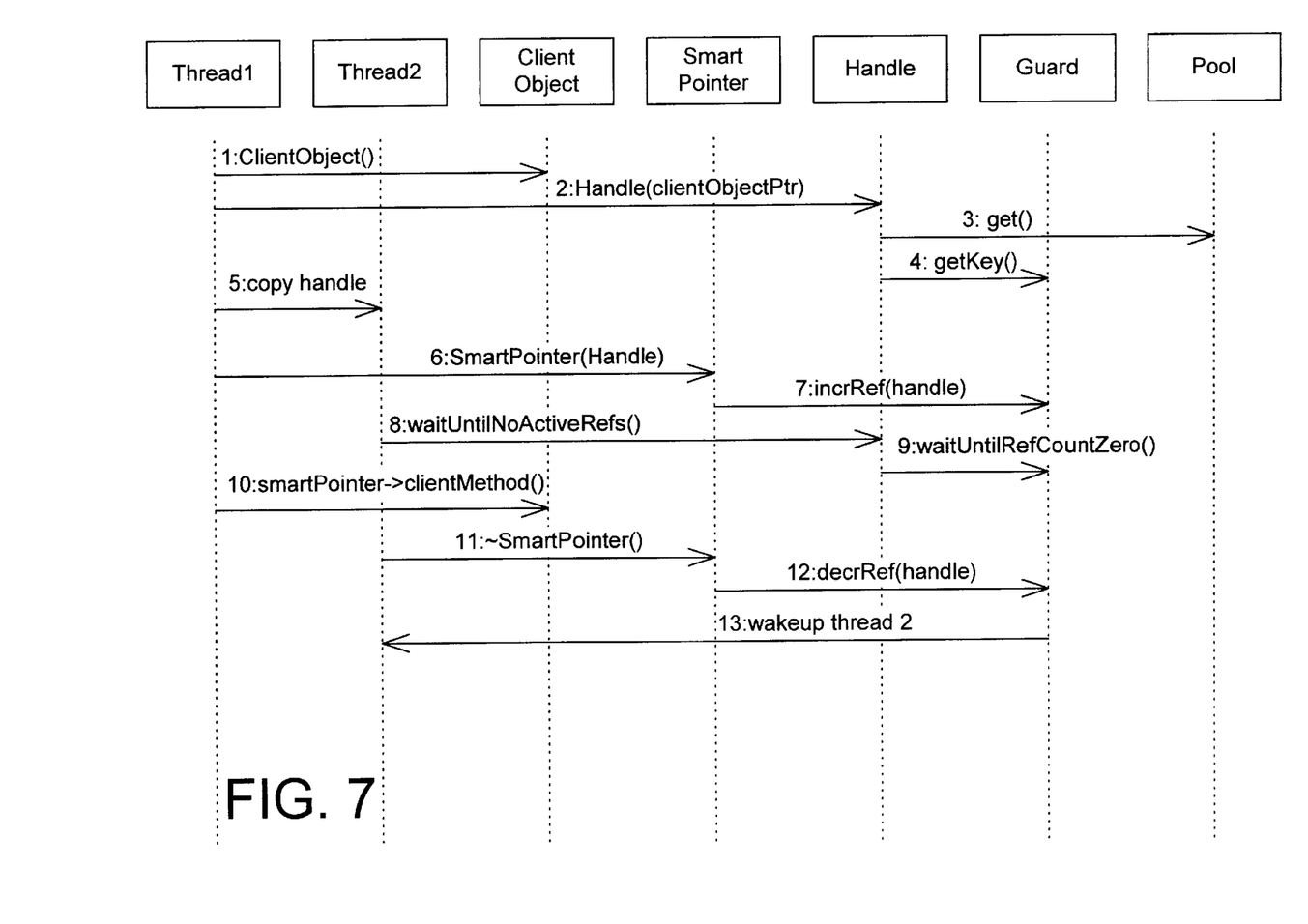
FIG. 7 is an object interaction diagram showing the steps taken for the classes of FIG. 5 to suspend the activity of a thread until no threads are referencing the managed object.
Figure 8:
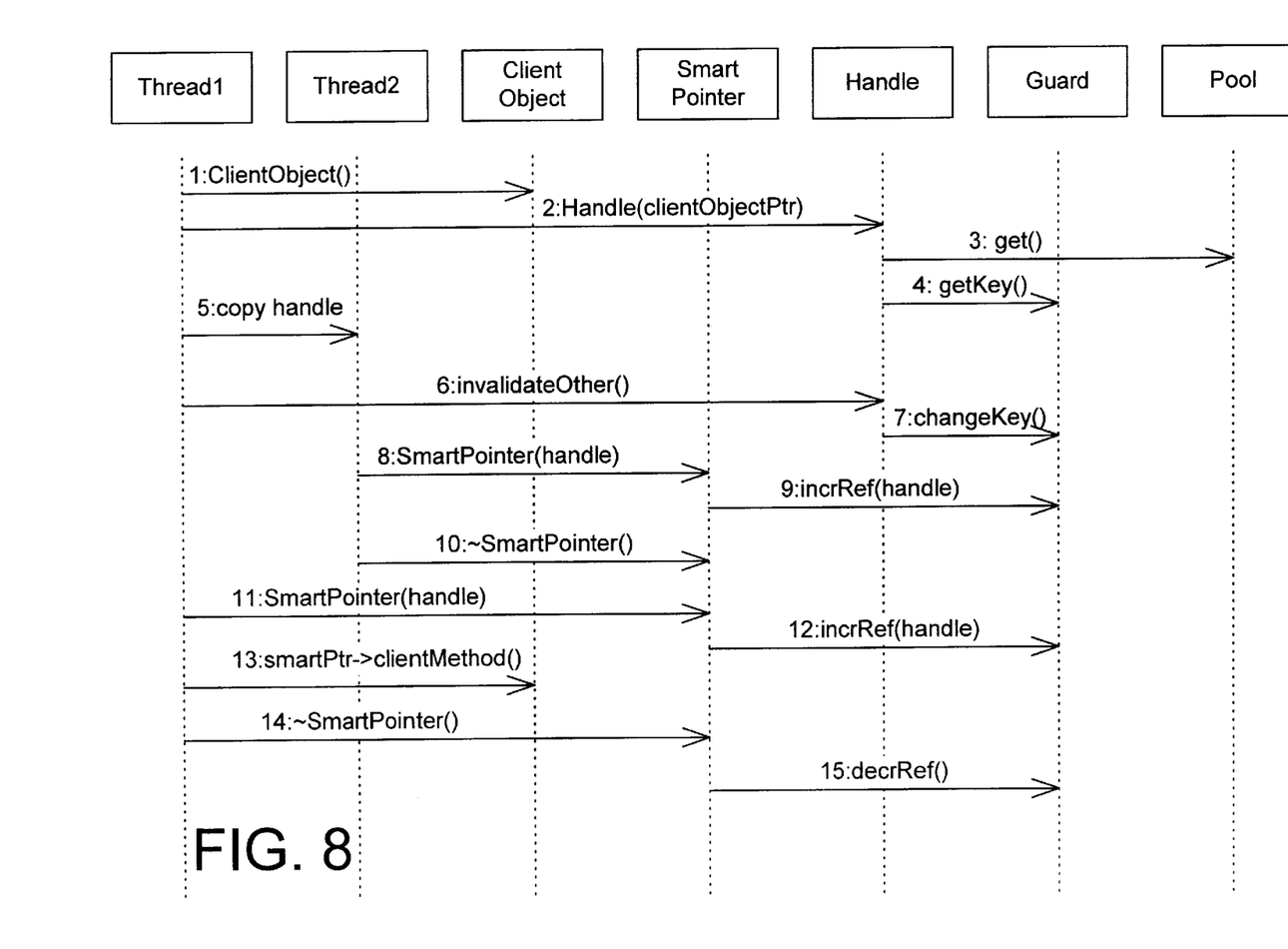
FIG. 8 is an object interaction diagram showing the steps taken for the classes of FIG. 5 for a thread to gain exclusive access to a managed object.

The operation of a smart passive reference as represented in FIG. 5 may best be understood with reference to the object interaction diagrams of FIGS. 6–8. Referring now to FIG. 6, the steps for creating, accessing, and deleting a managed object are shown. We assume for this example that three different threads interact with the managed object. Thread 1 invokes the ClientObject( ) constructor method (step 1), which instantiates an instance of the client object, which is one specific type of managed object. Next, Thread 1 invokes the Handle( ) constructor method, passing the pointer to the ClientObject as a parameter (step 2). In response, a Handle instance is created that corresponds to the smart passive reference of the preferred embodiments. The Handle instance then invokes the get( ) method on a Pool object, which represents a pool of persistent managed objects that are part of the heap (step 3). In response, a Guard instance is returned from the pool. Next, the Handle instance invokes the getKey( ) method on the Guard instance (step 4), which returns a unique key in the Guard object that controls access to the ClientObject. The value of the key is then copied to the Handle object.

We assume that Thread 2 and Thread 3 also want to access the ClientObject, so Thread 1 copies the handle to these threads in steps 5 and 6. Next, a smart pointer (i.e., active reference) is created using the handle by invoking the SmartPointer( ) constructor method, passing the Handle as a parameter (step 7). Once the SmartPointer is created, the SmartPointer invokes the incrRef( ) method on the Guard object. By invoking the incrRef( ) method (step 8), the SmartPointer checks to see if it is authorized to access the ClientObject by determining whether the key in the Handle matches the key in the Guard object, and if so, the Guard object returns the pointer to the ClientObject, and the reference count is incremented by one. The SmartPointer now points to the ClientObject. We now assume that Thread 2 is done interacting with the ClientObject, and it thus invokes the deleteManagedObject( ) method on the Handle class (step 9), which in turn invokes the deleteManagedObject( ) method on the Guard object (step 10), which invalidates the key in the Guard object to inhibit further accesses to the ClientObject, and marks the ClientObject for deletion. The ClientObject will not actually be deleted until there are no more active references (i.e., when the reference count goes to zero).

We now assume that Thread 1 wants to access the ClientObject by invoking the clientMethod( ) defined on the ClientObject, and invokes the clientMethod( ) (step 11). Next, we assume that Thread 3 wants to access the ClientObject, so it invokes the SmartPointer( ) constructor in step 12. However, Thread 3 cannot access the ClientObject because the key in its Handle does not match the key in the Guard object, because the key in the Guard object was invalidated in step 10. For this reason, the SmartPointer object invokes the incrRef( ) method in step 13 and determines that the keys in the Handle and Guard do not match, so the reference count is not incremented, NULL is returned as the SmartPointer value, and the ~SmartPointer( ) destructor method is invoked (step 14), which deletes the Smart-Pointer without decrementing the reference count because the SmartPointer could not gain access to the ClientObject. At this point we assume that Thread 1 has finished its operations on the ClientObject, and invokes the ~SmartPointer( ) destructor method (step 15). The deletion of the SmartPointer in Thread 1 results in the SmartPointer invoking the decrRef( ) method on the Guard class to decrement the reference count (step 16). At this point the reference count has gone to zero, and the ClientObject was marked for deletion in step 10, so the Guard object invokes the delete ClientObjectPointer( ) method on the ClientObject to delete the ClientObject (step 17). The Guard object then invokes the free( ) method on the Pool object to return the ClientObject to the storage pool (step 18).

One advantage of using the smart passive reference of the preferred embodiments is that a thread may be suspended (or put to sleep) until no threads are referencing the ClientObject. This scenario is shown in FIG. 7. Steps 1–5 create a ClientObject, a corresponding handle, get a guard object from the pool, get a key from the guard object, and copy the handle to Thread 2, the same as for steps 1–5 in FIG. 6 described above. A SmartPointer is then created using the Handle (step 6), which causes the reference count to be incremented (step 7) because the key in the Handle matches the key in the Guard object. Thread 2 then decides it wants exclusive access to the ClientObject, so it invokes the waitUntilNoActiveRefs( ) method on the Handle class (step 8). In response, the Handle object invokes the waitUntilRefCountZero( ) method on the Guard object (step 9), which sets the status in the Guard object to indicate that a thread is waiting and puts Thread 2 to sleep (i.e., suspends the activity of Thread 2) until the reference count goes to zero. (Note that the reference count is currently 1 because it was incremented in step 7). Thread 1 then accesses the clientMethod( ) on the ClientObject in step 10, and then invokes the ~SmartPointer( ) destructor in step 11, which calls the decrRef( ) method on the Guard object (step 12). This decrementing of the reference count causes the reference count to go to zero, which the Guard object detects. The Guard object then wakes up Thread 2 (step 13).

FIG. 8 illustrates steps that can be taken to obtain exclusive access to a ClientObject. Steps 1–5 are identical to steps 1–5 of FIGS. 6 and 7, described above. Thread 1 then invokes the invalidateOther( ) method on the Handle object (step 6). In response, the Handle object invokes the changeKey( ) method on the Guard object (step 7), which changes the key in the Guard object and returns the new key to the Handle. This new key is stored only in this instance of the Handle, while other instances of the Handle (e.g., the Handle in Thread 2) retain their old key values. To gain exclusive access, the invalidateOther( ) method must be invoked before the waitUntilNoActiveRefs( ) method. In FIG. 8, Thread 1 can obtain exclusive access to the ClientObject by invoking the waitUntilNoActiveRefs( ) method after step 7. When Thread 2 attempts to construct a SmartPointer in step 8, it invokes the incrRef( ) method in step 9, passing the Handle as a parameter. The key in the Handle object is the old key, while the key in the Guard object is the new key. Because the two do not match, the reference count is not incremented, NULL is returned as the value for the SmartPointer, and the destructor for the Smart-Pointer object is invoked (step 10). Note that the reference count was not decremented following the deletion of the SmartPointer because the SmartPointer was unable to access the ClientObject.

Next, we assume that Thread 1 invokes the SmartPointer( ) constructor method to create an active reference to the ClientObject (step 11). The newly created SmartPointer( ) then invokes the incrRef( ) method, passing the Handle as a parameter (step 12). Because the key in the Handle for Thread 1 is the same as the key in the Guard object, step 12 returns the ClientObjectPtr as the value for the SmartPointer. Thread 1 then accesses the clientMethod( ) in the ClientObject in step 13 and deletes the SmartPointer in step 14, which results in the reference count being decremented in step 15.

Note that the scenarios shown in FIGS. 6–8 are shown to illustrate the general concepts relating to the use of a smart passive reference in accordance with the preferred embodiments. Many other scenarios, nearly endless in number, could be constructed within the scope of the present invention. For this reason, the steps and principles illustrated in FIGS. 5–8 should be construed as an illustration of one possible implementation, and should not be construed as limiting the scope of the present invention.

Using a smart passive reference in accordance with the preferred embodiments avoids the problems of circular active references in the prior art, and provides a greater degree of control over the creation, access, and deletion of a managed object. A thread may be suspended until no other threads have an active reference to the object. In addition, a thread may gain exclusive access to an object by invalidating the passive references of other threads. Using smart passive references as taught herein results in enhanced control and access to a managed object that cannot be achieved using prior art methods.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

I claim:

1. An apparatus comprising:
   at least one processor;
   a memory coupled to the at least one processor;
   a first object oriented object residing in the memory;
   a handle object residing in the memory that corresponds to the first object, the handle object comprising a smart passive reference to the first object; and
   a smart pointer object residing in the memory, the smart pointer object being generated from the handle object and being used as an active reference to access the first object.

2. The apparatus of claim 1 wherein the handle object defines at least one object method that invalidates at least one handle object in a different thread.

3. The apparatus of claim 1 wherein the handle object references at least one object method that causes the thread invoking the object method to wait until there are no active references to the first object before accessing the first object.

4. The apparatus of claim 1 further comprising a first object method to increment a reference count for the first object, the reference count comprising an indication of the number of active references to the first object, and a second object method to decrement the reference count.

5. The apparatus of claim 1 further comprising a guard object that is a helper object for the handle object, wherein the guard object contains a key and the handle object contains a key, and access to the managed object by the smart pointer object is only allowed if the two keys match.

6. The apparatus of claim 5 wherein the guard object defines object methods for allocating and returning a managed object to a pool of persistent managed objects.

7. The apparatus of claim 5 wherein the guard object defines object methods for retrieving and changing the key in the guard object.

8. The apparatus of claim 5 wherein the guard object defines object methods for marking the first object for deletion.

9. The apparatus of claim 1 wherein the first object comprises a managed object that is allocated from a pool of persistent managed objects.

10. An apparatus comprising:
    at least one processor;
    a memory coupled to the at least one processor;
    a managed object oriented object residing in the memory, the managed object being allocated from a pool of persistent managed objects;
    a handle object residing in the memory that corresponds to the first object, the handle object comprising a smart passive reference to the first object, the handle object containing a first key, the handle object defining at least one object method that invalidates at least one handle object in a different thread, the handle object further defining at least one object method that causes the thread invoking the object method to wait until there are no active references to the first object before accessing the first object;
    a guard object residing in the memory, wherein the guard object contains a second key and a reference count, the guard object defining a first object method to increment the reference count for the first object, the reference count comprising an indication of the number of active references to the first object, and a second object method to decrement the reference count, the guard object further defining object methods for allocating and returning a managed object to a pool of persistent managed objects, object methods for retrieving and changing the key in the guard object, and object methods for marking the first object for deletion; and
    a smart pointer object residing in the memory, the smart pointer object being generated from the handle object and being used as an active reference to access the first object, the smart pointer accessing the first object only if the first key matches the second key.

11. An apparatus comprising:
    a memory;
    a first object oriented object residing in the memory;
    means for generating a handle corresponding to the first object, the handle comprising a smart passive reference to the first object; and means for generating a smart pointer object from the handle object, the smart pointer object comprising a smart active reference to the first object.

12. A method for a current thread to access a first object oriented object, the method comprising the steps of:
(1) instantiating the first object;
(2) generating a handle corresponding to the first object, the handle comprising a smart passive reference to the first object;
(3) when the current thread needs to access the first object, performing the steps of:
   (3.1) generating a smart pointer object from the handle object;
   (3.2) determining whether the smart pointer object is authorized to access the first object;
   (3.3) if the smart pointer is authorized to access the first object, selectively granting to the current thread access to the first object.

13. The method of claim 12 further comprising the step of:
(2.1) generating a guard object corresponding to the first object, wherein the guard object contains a key and the handle contains a key, and wherein access to the first object by the smart pointer is only allowed if the two keys match.

14. The method of claim 13 wherein the guard object allocates and returns a managed object to a pool of persistent managed objects.

15. The method of claim 13 wherein the guard object retrieves and changes the key in the guard object.

16. The method of claim 13 wherein the guard object marks the first object for deletion.

17. The method of claim 12 wherein if the smart pointer is authorized to access the first object in step 3.3, performing the steps of:
   (3.3.1) incrementing a reference count corresponding to the first object;
   (3.3.2) setting the value of the smart pointer to point to the first object;
   (3.3.3) performing at least one operation on the first object;
   (3.3.4) determining whether to delete the smart pointer object;
   (3.3.5) if the smart pointer object should be deleted, performing the steps of:
      (3.3.5.1) decrementing the reference count; and
      (3.3.5.2) determining whether the reference count has gone to zero.

18. The method of claim 17 wherein if the reference count has gone to zero in step 3.3.5.2, performing the steps of:
   (3.3.5.3.1) determining whether a thread is waiting for the reference count to go to zero, and if so, waking up the waiting thread;
   (3.3.5.3.2) determining whether the first object is marked for deletion;
   (3.3.5.3.3) if the first object is not marked for deletion, determining whether the current thread needs to access the first object again, and if so, returning to step 3.1.

19. The method of claim 18 wherein if the reference count has not gone to zero in step 3.3.5.2, performing the step of: determining whether the current thread needs to access the first object again, and if so, returning to step 3.1.

20. The method of claim 12 further comprising the step of suspending the activity of a thread until no threads are referencing the first object.

21. The method of claim 12 further comprising the step of gaining exclusive access to the first object by invalidating handle objects corresponding to the first object in all other threads.

22. A method for a current thread to access a first object oriented object, the method comprising the steps of:
(1) instantiating the first object;
(2.1) generating a handle corresponding to the first object, the handle comprising a smart passive reference to the first object, the handle containing a first key;
(2.2) generating a guard object corresponding to the first object, wherein the guard object contains a second key;
(3) when a second object needs to access the first object, performing the steps of:
   (3.1) generating a smart pointer object from the handle object;
   (3.2) determining whether the smart pointer object is authorized to access the first object by comparing the first and second keys, and by granting access to the first object by the smart pointer only if the two keys match;
   (3.3) if the smart pointer is authorized to access the first object, performing the steps of:
      (3.3.1) incrementing a reference count corresponding to the first object;
      (3.3.2) setting the value of the smart pointer to point to the first object;
      (3.3.3) performing at least one operation on the first object;
      (3.3.4) determining whether to delete the smart pointer object;
      (3.3.5) if the smart pointer object should be deleted, performing the steps of:
         (3.3.5.1) decrementing the reference count;
         (3.3.5.2) determining whether the reference count has gone to zero;
         (3.3.5.3) if the reference count has gone to zero, performing the steps of:
            (3.3.5.3.1) determining whether a thread is waiting for the reference count to go to zero, and if so, waking up the waiting thread;
            (3.3.5.3.2) determining whether the first object is marked for deletion;
            (3.3.5.3.3) if the first object is not marked for deletion, determining whether the current thread needs to access the first object again, and if so, returning to step 3.1;
         (3.3.5.4) if the reference count has not gone to zero, determining whether the current thread needs to access the first object again, and if so, returning to step 3.1.

23. The method of claim 22 further comprising the step of suspending the activity of a thread until no threads are referencing the first object.

24. The method of claim 22 further comprising the step of gaining exclusive access to the first object by invalidating handle objects for the first object in all other threads.

25. A program product comprising:
a smart passive reference to a first object oriented object;
a smart pointer object generated from the smart passive reference to access the first object, the smart pointer object comprising a smart active reference to the first object; and
signal bearing media bearing the smart passive reference and the smart pointer object.

26. The program product of claim 25 wherein the signal bearing media comprises recordable media.

27. The program product of claim 25 wherein the signal bearing media comprises transmission media.

28. The program product of claim 25 wherein the smart passive reference defines at least one object method that invalidates at least one smart passive reference in a different thread.

29. The program product of claim 25 wherein the smart passive reference references at least one object method that causes the thread invoking the object method to wait until there are no active references to the first object before accessing the first object.

30. The program product of claim 25 further comprising a first object method to increment a reference count for the first object, the reference count comprising an indication of the number of active references to the first object, and a second object method to decrement the reference count.

31. The program product of claim 25 further comprising a guard object residing on the signal bearing media that is a helper object for the smart passive reference, wherein the guard object contains a key and the smart passive reference contains a key, and access to the managed object by the smart pointer object is only allowed if the two keys match.

32. The program product of claim 31 wherein the guard object defines object methods for allocating and returning a managed object to a pool of persistent managed objects.

33. The program product of claim 31 wherein the guard object defines object methods for retrieving and changing the key in the guard object.

34. The program product of claim 31 wherein the guard object defines object methods for marking the first object for deletion.

35. The program product of claim 25 wherein the first object comprises a managed object that is allocated from a pool of persistent managed objects.

36. A program product comprising:

a managed object class;

a handle class that corresponds to the managed object class, the handle class comprising a smart passive reference to the managed object class, the handle class defining a first key, the handle object defining at least one object method that invalidates at least one handle instance in a different thread, the handle class further defining at least one object method that causes the thread invoking the object method to wait until there are no active references to the managed object before accessing the managed object;

a guard class that defines a second key and a reference count, the guard class defining a first object method to increment the reference count for the managed object, the reference count comprising an indication of the number of active references to the managed object, and a second object method to decrement the reference count, the guard class further defining object methods for allocating and returning a managed object instance to a pool of persistent managed objects, object methods for retrieving and changing the key in a guard instance, and object methods for marking a managed object instance for deletion;

a smart pointer class that is generated from a handle instance and that is used as an active reference to access a managed object instance, the smart pointer accessing the managed object instance only if the first key matches the second key; and signal bearing media bearing the managed object class, the handle class, the guard class, and the smart pointer class.

37. The program product of claim 36 wherein the signal bearing media comprises recordable media.

38. The program product of claim 36 wherein the signal bearing media comprises transmission media.

\* \* \* \* \*